United States Patent [19]

Sette et al.

[11] 4,376,544

[45] Mar. 15, 1983

[54] TOW BAR LOCK

[76] Inventors: Vincent E. Sette, 25 S. Cherry Valley Ave., West Hempstead, N.Y. 11552; Edward Fellman, 1272 E. 85th St., Brooklyn, N.Y. 11236

[21] Appl. No.: 245,470

[22] Filed: Mar. 19, 1981

Related U.S. Application Data

[63] Continuation of Ser. No. 78,749, Sep. 25, 1979, abandoned.

[51] Int. Cl.³ .................... B60D 1/00; B60R 25/00; E05B 73/00
[52] U.S. Cl. ........................................ 280/507; 70/14
[58] Field of Search ............ 280/507, 504, 515, 457; 70/14, 15, 16, 17, 18, 19, 34, 49, 163, 164, 229, 232, 259

[56] References Cited

U.S. PATENT DOCUMENTS

| | | | |
|---|---|---|---|
| 1,617,204 | 2/1927 | Errecalde | 70/34 |
| 3,782,762 | 1/1974 | Nagy et al. | 280/507 |
| 3,884,057 | 5/1975 | Maurer | 70/259 |
| 4,068,504 | 1/1978 | Pickard | 70/14 X |

FOREIGN PATENT DOCUMENTS

| | | | |
|---|---|---|---|
| 938366 | 1/1956 | Fed. Rep. of Germany | 280/504 |
| 106597 | 1/1875 | France | 70/20 |
| 2315414 | 1/1977 | France | 280/507 |
| WO81/00832 | 4/1981 | PCT Int'l Appl. | 280/507 |

*Primary Examiner*—Joseph F. Peters, Jr.
*Assistant Examiner*—M. J. Hill
*Attorney, Agent, or Firm*—Albert C. Nolte, Jr.; Edward B. Hunter

[57] ABSTRACT

The present proposal comtemplates an anti-theft device for unattended trailers, in the nature of a cover-plate assembly for locking the open end of the trailer tow bar to prevent unauthorized removal of the trailer as by connecting the open end of the trailer bar to a peg on a towing vehicle. The assembly may comprise an underplate with a centrally disposed pintle and an apertured overplate or coverplate constructed and arranged to coact with the underplate to effectively prevent access to the opening at the end of the tow bar. For convenience, the two plates may be joined in spaced relationship as by a steel cable fixed at its ends, respectively, to the top side of the coverplate and to the reverse side of the underplate.

4 Claims, 7 Drawing Figures

TOW BAR LOCK

This application is a continuation of application Ser. No. 78,749, filed Sept. 25, 1979, now abandoned.

BRIEF SUMMARY OF THE INVENTION

In these days of rapid locomotion and transportation of people and their possessions, and of many different kinds of articles of commerce, from place to place, thievery with respect to such possessions and articles is all too common. In the vast stretches and reaches of present day airports, for example, or other transportation centers, goods, bags and many other items temporarily left unattended on a trailer or like vehicle may be, and often are, stolen or made off with by attaching or connecting the unattended trailer to an unauthorized tow vehicle, and driving the tow truck with the unattended loaded trailer following to another location for subsequent disposal of the stolen goods.

In the past various methods have been proposed and tried, with varying success, to combat this unfortunate situation. Increasing the numbers of security personnel is one means, but centers of transportation today are so large and so complex that the cost involved in such increases of personnel has been found to be not economically justifiable.

It has also been proposed, as in U.S. Pat. No. Re. 28,187 to employ complex anti-theft devices in the nature of means for preventing unauthorized access to the eye or ring end of tow bars. Such may comprise an arrangement of apertured covers for the ring, with recessed inserts including a housing for receiving a removable lock for barring access to the inserts thus preventing theft of the trailer contents. But such devices obviously are expensive to install. They are also subject to frequent malfunctioning. Thus they fall short of their purpose. Ostensibly they are not vulnerable to theivery because their locking component is within a recess of the housing. In practice and in fact, however, such devices are vulnerable because the housing member supposedly guarding the lock means is just as subject to attack and to destruction as an exposed lock: with a sledge hammer, for example.

The present invention, therefore, proposes a simplified and less expensive anti-theft device for situations of the character described, which is no more vulnerable than the prior art more complex and more expensive locking means above discussed. Accordingly there is here proposed an anti-theivery device in the nature of a tow bar lock for the open end or eye of a trailer bar. The lock may comprise an underplate with a pintle extending upwardly and centrally therefrom and an apertured coverplate constructed and arranged so as to coact with the underplate thereby to effectively prevent access to the opening at the end of the tow bar. For convenience in handling, transporting and storing such assembly the two plates may be joined in spaced relation as by a steel cable of short length fixed at its ends respectively to the top of the coverplate and to the reverse side of the underplate. The length of the connecting steel cable, of course, will be determined by the bulk or thickness of the tow bar eye, access to which is to be prevented.

DESCRIPTION OF THE DRAWINGS

With the above and other objects in view, as will be apparent, the invention consists in the construction, combination and arrangement of parts, all as hereinafter more fully described, claimed and illustrated in the accompanying drawings, wherein:

DETAILED DESCRIPTION

Figure 1:
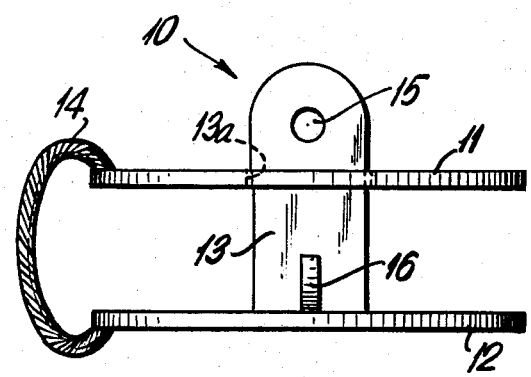
FIG. 1 is a front view of the preferred form of the invention including the assembled unit of the present device comprising the underplate and coverplate connected together as by a steel cable with the pintle projecting centrally from the underplate and through the coverplate, the pintle being provided with means for fastening the two plates together.

In FIG. 1 as above indicated is shown a typical embodiment of the present invention comprising a coacting assembly 10 of an underplate 12 spaced from the coverplate member 11 to receive the neck or ring end portion of a tow bar (to be referred to hereinafter more particularly). Projecting from the underplate 12 is a pintle 13 which extends through an aperture 13a in a central portion of the coverplate 11. The upper portion of the pintle 13 extending above the cover 11 is apertured as at 15 to receive a conventional fastening means such as a lock device (not shown). To link the spaced covers 11, 12 a steel cable or connector 14 may be welded or otherwise secured to the sides of the plates 11, 12, the position of cable 14 being such as not to interfere with the interposition of the trailer tow bar when the device 10 is functioning as an anti-theft assembly.

Figure 2:
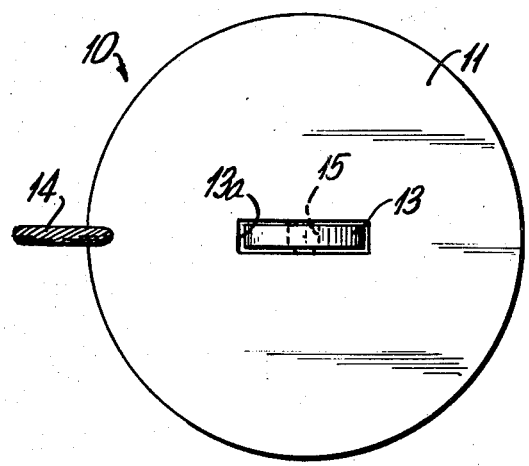
FIG. 2 is a plan view of the same arrangement as that shown in FIG. 1.
Figure 3:
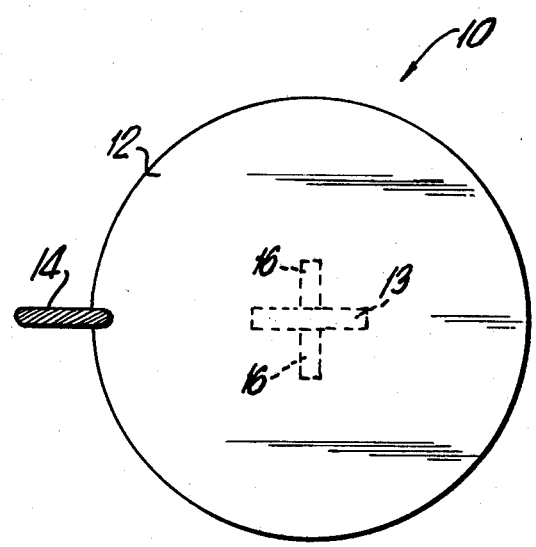
FIG. 3 is a plan view of the underside of the bottom plate member of the invention of FIG. 1.

In FIG. 2 there is seen a plan view of the assembly of FIG. 1 but including primarily in the assembly 10 the outer exposed surface of coverplate 11 with the pintle 13 apertured as at 15 extending upwardly of the top surface of the coverplate 11; and with the cable connector 14 shown as secured to a marginal portion of the face of the coverplate 11.

Referring again to FIG. 1 the pintle 13 there seen may be reinforced if desired as by short pieces of steel 16 diagonally disposed so as to run at an angle from the face of the underplate 12 to brace against either side of the length of the pintle member 13.

Preferably the assembly of FIGS. 1 and 2 is made entirely of cast iron or other strong composition material and the connecting link 14 of hightwist steel cable or the like. As will be understood the two plates 11 and 12 may be painted in any appropriate color or colors so as to match the color of the tow bar with which they are to be used or with some other matching or contrasting arrangement. In addition both the upper surface of the cover plate 11 and the reverse side of the bottom plate or underplate 12 may be stenciled or otherwise marked with any desired data or information as, for example, a particular trademark of the manufacturer or user of the device, and the name and/or address of the proprietor or manufacturer. A patent number or patent numbers may also be added in any of these locations as well as any other data considered appropriate for the same.

The shape of the aperture 15 in the pintle 13 is not critical except to the extent that it must be large enough to accommodate any lock or other fastening device intended to be used in conjunction therewith. The length of the connecting cable 14 will of course be determined by the relative width or bulk of the tow bar eye or ring.

Figure 4:
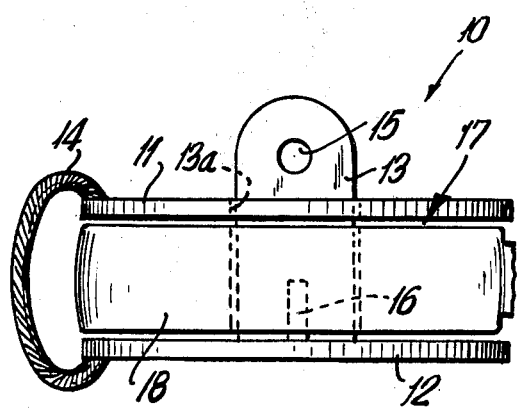
FIG. 4 is a front view as per FIG. 1 but illustrating also the end ring of the tow bar locked in place or adapted to be locked in place between the under and coverplates.

FIG. 4 is illustrative of the practice of the present anti-theft device wherein the end portion 18 of the trailer tow bar (shown only partially) is embraced or contained within the space defined by the gap between the baseplate 12 and the coverplate member 11 as permitted by the length of the connecting cable 14. As there seen, the pintle member 13 of the bottom plate 12 extends through the full width and bulk of the eye 18 and thereabove through the apertured portion 13a of the coverplate 11 so as to permit the interposition of a conventional lock member or fastener (not shown) in the free standing apertured top portion of the pintle 15.

As will be understood, with the arrangement in FIG. 4 as described, the eye or end portion 18 of the tow bar 17 is effectively locked within the covering plates 11 and 12 of the assembly 10 such that a tow vehicle will be unable to attach a hitch or peg by running it through the eye 18 of the tow bar 17. Thus by means of the assembly 10, the tow bar 17 is locked in such a way that the covers 11, 12 prevent any unauthorized person from having access to the tow bar 17 so as to tow it away with the trailer and contents to which, of course, it is connected.

Figure 5:
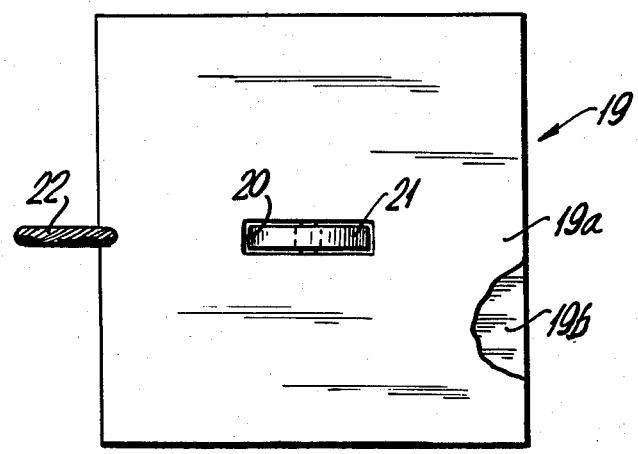
FIG. 5 is a modified plan view of the invention in the form of a rectangularly shaped attachment unit for the ring like end of the tow bar.

FIG. 5 illustrates an alternative but less preferred embodiment of the present anti-theft device. This may comprise a rectangularly shaped assembly 19 including spaced top and bottom coverplates 19a and 19b, with the bottom plate 19b including a pintle 21 projecting from an aperture 20 in the coverplate 19a. The two plates 19a, 19b of the assembly 19 may be interconnected as by means of a steel cable connecting piece 22. The rectangularly shaped assembly 19 is adapted to be used in those situations where the shape of the end member 18 of the tow bar 17 is not circular or the form of an eye, but rather when such member is rectangularly shaped or shaped in the form of a square or in an analogous shape.

Figure 6:
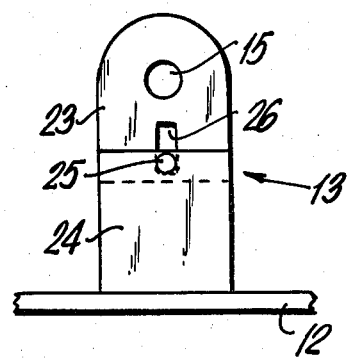
FIG. 6 is a side view of the pintle member only of FIGS. 1-5 illustrating means for adjusting the relative length or height of the pintle to accommodate thereby ring members of varying bulk or thickness.

FIG. 6, of course, is specific to the construction of a pintle 13 projecting from the bottom plate 12 and adapted to be inserted in the central opening or aperture of the upperplate member 11 (not shown in FIG. 6). That is to say in this embodiment of the pintle arrangement adjustment means are provided for lengthening or shortening the effective reach of the pintle 13. To that end the pintle member 13 may be divided into an upper portion 23 and lower portion 24 with the upper member 23 being adapted to slide in overlapping relationship against the side of the lower part 24 as indicated by the dotted horizontal lines in FIG. 6. To provide for such adjustment of the effective reach or length of the pintle 13 the lower member 24 thereof is provided with a pin or set screw 25 and is adapted to travel within the throughway or slot 26. By this means the reach of the pintle 13 may be shortened or lengthened as required by the bulk and thickness of the tow bar end 18 access to which is to be prevented according to the present invention.

Figure 7:
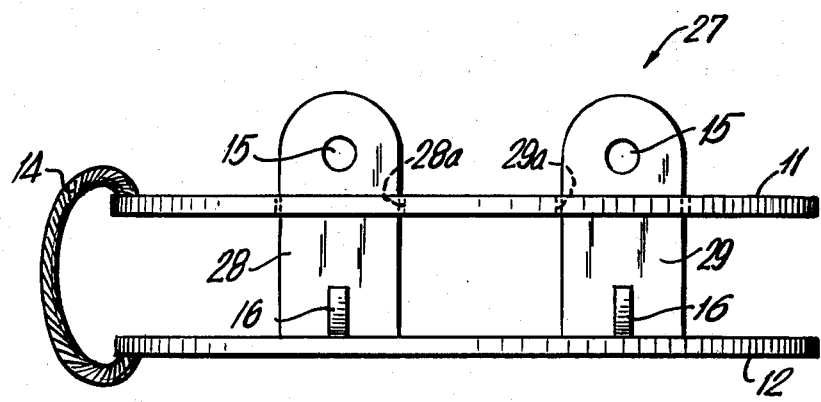
FIG. 7 is a modified embodiment of the present invention in the form of a multi-pintle alternative to the single pintle embodiment of FIGS. 1-6 inclusive.

If desired, the effective strength of the present anti-theft device may be increased by providing two or more pintles for the baseplate and projecting them through accommodating apertures in the upperplate. This embodiment is illustrated in FIG. 7 of the drawings, and comprises the coacting base and coverplates 12, 11, two spaced pintles 28 and 29, both reinforced as at 16, and projecting, respectively, through apertures 28a and 29a in the coverplate member 11, and provided with means 15 for fastening or locking the two plates 11, 12 together with the ring end of the tow bar (not shown) therebetween; and with the cable connector 14 securely tying the two plate members 11 and 12 together at their matching marginal portions.

What is claimed is:

1. Apparatus for locking a tow bar having an apertured end, comprising:
   a bottom underplate;
   a top coverplate, said bottom underplate and said top coverplate being of substantially uniform size and shape so as to receive therebetween and cover the apertured end of the tow bar;
   an elongate pintle affixed to and projecting from the upper surface of said bottom underplate;
   a centrally disposed through aperture formed in said top coverplate;
   a locking aperture formed in the distal end of said pintle for receiving a locking device therein, whereby when said bottom underplate and said top coverplate are arranged to cover the apertured end of the tow bar, said pintle being of a length such that said pintle extends through said aperture and said locking aperture is above the upper surface of and extends above the plane of said top coverplate for cooperating with the locking device to prevent separation of said bottom underplate and said top coverplate; and wherein
   said elongate pintle is affixed to said upper surface of said bottom underplate by means of a plurality of angularly disposed reinforcement members affixed to said pintle and to said upper surface of said bottom underplate.

2. Apparatus for locking a tow bar having an apertured end, comprising:
   a bottom underplate;
   a top coverplate, said bottom underplate and said top coverplate being of substantially uniform size and shape so as to receive therebetween and cover the apertured end of the tow bar;
   an elongate pintle affixed to and projecting from the upper surface of said bottom underplate, said elongate pintle including means for adjusting the length of said elongate pintle relative to the thickness of the apertured end of the tow bar;
   a centrally disposed through aperture formed in said top coverplate; and
   a locking aperture formed in the distal end of said pintle for receiving a locking device therein, whereby when said bottom underplate and said top coverplate are arranged to cover the apertured end of the tow bar, said pintle extends through said aperture and said locking aperture is above the upper surface of said top coverplate for cooperating with the locking device to prevent separation of said bottom underplate and said top coverplate.

3. Apparatus for locking a tow bar having an apertured end, comprising:

a bottom underplate;

a top coverplate, said bottom underplate and said top coverplate being of substantially uniform size and shape so as to receive therebetween and cover the apertured end of the tow bar;

a plurality of elongate pintles arranged in spaced-apart relationship affixed to and projecting from the upper surface of said bottom underplate;

a plurality of through apertures correspondingly formed in said top coverplate for receiving thereinto and therethrough said plurality of elongate pintles; and a plurality of locking apertures, one formed in each of said plurality of pintles for receiving a locking device therein, said pintles being of a length greater than the sum of the thickness of said top coverplate plus the thickness of the apertured end of the tow bar, whereby when said bottom underplate and said top coverplate are arranged to cover the apertured end of the tow bar said pintles extend through said plurality of through apertures and said plurality of locking apertures are above the upper surfaces of, and extend above the plane of, said top coverplate for cooperating with the locking device to prevent separation of said bottom underplate and said top coverplate.

4. Apparatus for use on tow bars having apertures end portions of different thicknesses, comprising:

a bottom underplate;

a top coverplate, said bottom underplate and said top coverplate being of substantially uniform size and shape so as to receive therebetween and cover the apertured end of a tow bar;

a centrally disposed through aperture formed in said top coverplate;

a pintle affixed to and projecting from the upper surface of said bottom coverplate, the distal end of said pintle extending through said centrally disposed aperture in said top coverplate, said pintle means including means for adjusting the length thereof relative to the thickness of the apertured end portion of a tow bar; and a locking aperture formed in the distal end of said pintle for receiving a locking device, therein, whereby when said bottom underplate and said top coverplate are arranged to cover the apertured end of the tow bar, said pintle extends through said centrally disposed through aperture and said locking aperture is above the upper surface of said top coverplate for cooperating with the locking device to prevent separation of said bottom underplate and said top coverplate.

* * * * *